(12) United States Patent
Snyder et al.

(10) Patent No.: US 6,470,619 B1
(45) Date of Patent: Oct. 29, 2002

(54) SCENT DISPENSING DEVICE

(76) Inventors: Troy L. Snyder, Rte. #1 Box #393-H, Lumberport, WV (US) 26386; Pamela E. Snyder, Rte. #1 Box #393-H, Lumberport, WV (US) 26386

( * ) Notice: Subject to any disclaimer, the term of this patent is extended or adjusted under 35 U.S.C. 154(b) by 0 days.

(21) Appl. No.: 09/689,948

(22) Filed: Oct. 13, 2000

(51) Int. Cl.⁷ .................................................. A01M 23/00
(52) U.S. Cl. ............................. 43/1; 239/44; 239/48
(58) Field of Search ............................ 43/1; 239/43, 44, 239/48, 52; 242/55.55, 164

(56) References Cited

U.S. PATENT DOCUMENTS

| | | | |
|---|---|---|---|
| 4,272,036 A | * 6/1981 | Watermann | 242/96 |
| 4,523,717 A | 6/1985 | Schwab | |
| D286,503 S | 11/1986 | Bobrovniczky | |
| 4,682,715 A | 7/1987 | Reeves | |
| 4,788,787 A | * 12/1988 | Konietzki | 43/1 |
| 4,964,744 A | 10/1990 | Whitear | |
| 5,947,379 A | * 9/1999 | Freeman | 239/52 |

* cited by examiner

*Primary Examiner*—Charles T. Jordon
*Assistant Examiner*—Gabriel S Sukman

(57) ABSTRACT

A scent dispensing device for luring an animal to a hunter. The scent dispensing device includes a housing. The housing has a top portion and a bottom portion. The top and bottom portions are removably securable to each other such that a lumen is defined between the top and bottom portions. The bottom portion has an opening therein. The housing has an aperture therein. A rod is positioned in the housing. A nub extends away from and is integrally coupled to an end of the rod. The nub extends through the opening. A crank means for rotatinig the rod with respect to the housing is coupled to the nub. A flexible elongate member has a first end and second end. The first end is coupled to the rod. The second end of the flexible elongate member extends through said aperture. Scented fluid is placed in the lumen so that the flexible elongate member is coated with the fluid.

1 Claim, 3 Drawing Sheets

SCENT DISPENSING DEVICE

BACKGROUND OF THE INVENTION

1. Field of the Invention

The present invention relates to devices for propagating a scent and more particularly pertains to a new scent dispensing device for luring an animal to a hunter.

2. Description of the Prior Art

The use of devices for propagating a scent is known in the prior art. More specifically, devices for propagating a scent heretofore devised and utilized are known to consist basically of familiar expected and obvious structural configurations, notwithstanding the myriad of designs encompassed by the crowded prior art which have been developed for the fulfillment of countless objectives and requirements.

Known prior art includes U.S. Pat. No. 4,788,787; U.S. Pat. No. 4,682,715; U.S. Pat. No. 4,523,717; U.S. Des. Pat. No. 286,503; U.S. Pat. No. 4,272,036; and U.S. Pat. No. 4,964,744.

While these devices fulfill their respective, particular objectives and requirements, the aforementioned patents do not disclose a new scent dispensing device. The inventive device includes a housing. The housing has a top portion and a bottom portion. The top and bottom portions are removably securable to each other such that a lumen is defined between the top and bottom portions. The bottom portion has an opening therein. The housing has an aperture therein. A rod is positioned in the housing. A nub extends away from and is integrally coupled to an end of the rod. The nub extends through the opening. A crank means for rotating the rod with respect to the housing is coupled to the nub. A flexible elongate member has a first end and second end. The first end is coupled to the rod. The second end of the flexible elongate member extends through said aperture. Scented fluid is placed in the lumen so that the flexible elongate member is coated with the fluid.

In these respects, the scent dispensing device according to the present invention substantially departs from the conventional concepts and designs of the prior art, and in so doing provides an apparatus primarily developed for the purpose of luring an animal to a hunter.

SUMMARY OF THE INVENTION

In view of the foregoing disadvantages inherent in the known types of devices for propagating a scent now present in the prior art, the present invention provides a new scent dispensing device construction wherein the same can be utilized for luring an animal to a hunter.

The general purpose of the present invention, which will be described subsequently in greater detail, is to provide a new scent dispensing device apparatus and method which has many of the advantages of the devices for propagating a scent mentioned heretofore and many novel features that result in a new scent dispensing device which is not anticipated, rendered obvious, suggested, or even implied by any of the prior art devices for propagating a scent, either alone or in any combination thereof.

To attain this, the present invention generally comprises a housing. The housing has a top portion and a bottom portion. The top and bottom portions are removably securable to each other such that a lumen is defined between the top and bottom portions. The bottom portion has an opening therein. The housing has an aperture therein. A rod is positioned in the housing. A nub extends away from and is integrally coupled to an end of the rod. The nub extends through the opening. A crank means for rotating the rod with respect to the housing is coupled to the nub. A flexible elongate member has a first end and second end. The first end is coupled to the rod. The second end of the flexible elongate member extends through said aperture. Scented fluid is placed in the lumen so that the flexible elongate member is coated with the fluid.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new scent dispensing device apparatus and method which has many of the advantages of the devices for propagating a scent mentioned heretofore and many novel features that result in a new scent dispensing device which is not anticipated, rendered obvious, suggested, or even implied by any of the prior art devices for propagating a scent, either alone or in any combination thereof.

It is another object of the present invention to provide a new scent dispensing device which may be easily and efficiently manufactured and marketed.

It is a further object of the present invention to provide a new scent dispensing device which is of a durable and reliable construction.

An even further object of the present invention is to provide a new scent dispensing device which is susceptible of a low cost of manufacture with regard to both materials and labor, and which accordingly is then susceptible of low prices of sale to the consuming public, thereby making such scent dispensing device economically available to the buying public.

Still yet another object of the present invention is to provide a new scent dispensing device which provides in the apparatuses and methods of the prior art some of the advantages thereof, while simultaneously overcoming some of the disadvantages normally associated therewith.

Still another object of the present invention is to provide a new scent dispensing device for luring an animal to a hunter.

Yet another object of the present invention is to provide a new scent dispensing device which includes a housing. The housing has a top portion and a bottom portion. The top and bottom portions are removably securable to each other such that a lumen is defined between the top and bottom portions. The bottom portion has an opening therein. The housing has an aperture therein. A rod is positioned in the housing. A nub extends away from and is integrally coupled to an end of the rod. The nub extends through the opening. A crank means for rotating the rod with respect to the housing is coupled to the nub. A flexible elongate member has a first end and second end. The first end is coupled to the rod. The second end of the flexible elongate member extends through said aperture. Scented fluid is placed in the lumen so that the flexible elongate member is coated with the fluid.

Still yet another object of the present invention is to provide a new scent dispensing device that is capable of being opened such that different scents may be added and so that easy cleaning may be effectuated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
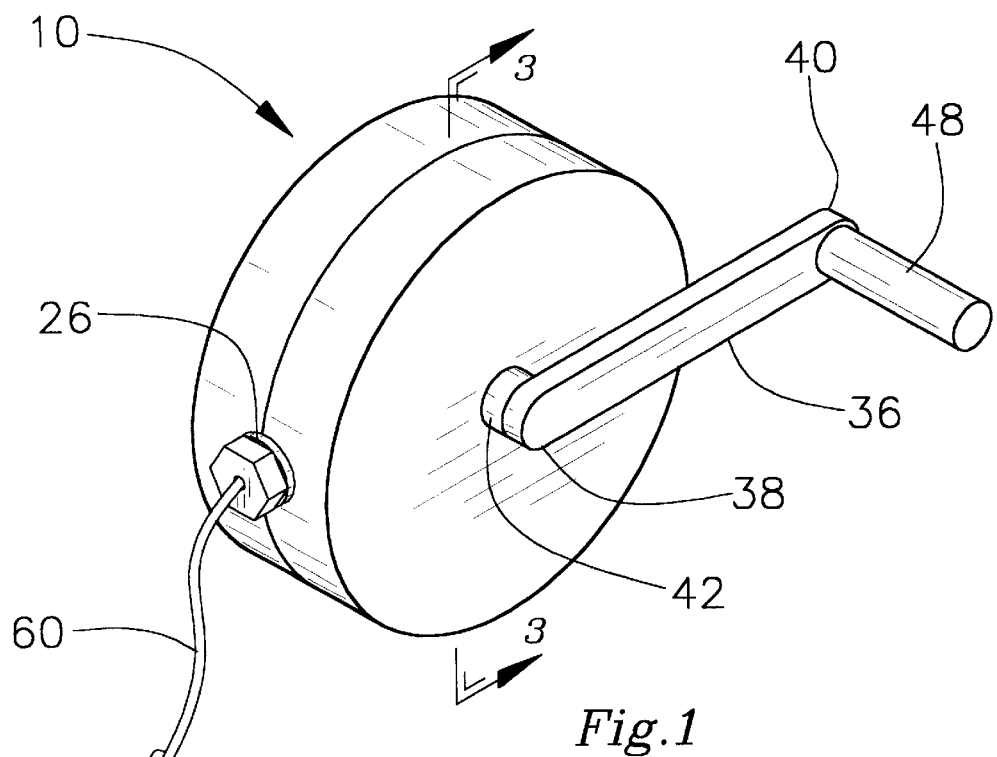
FIG. 1 is a schematic perspective view of a new scent dispensing device according to the present invention.
Figure 2:
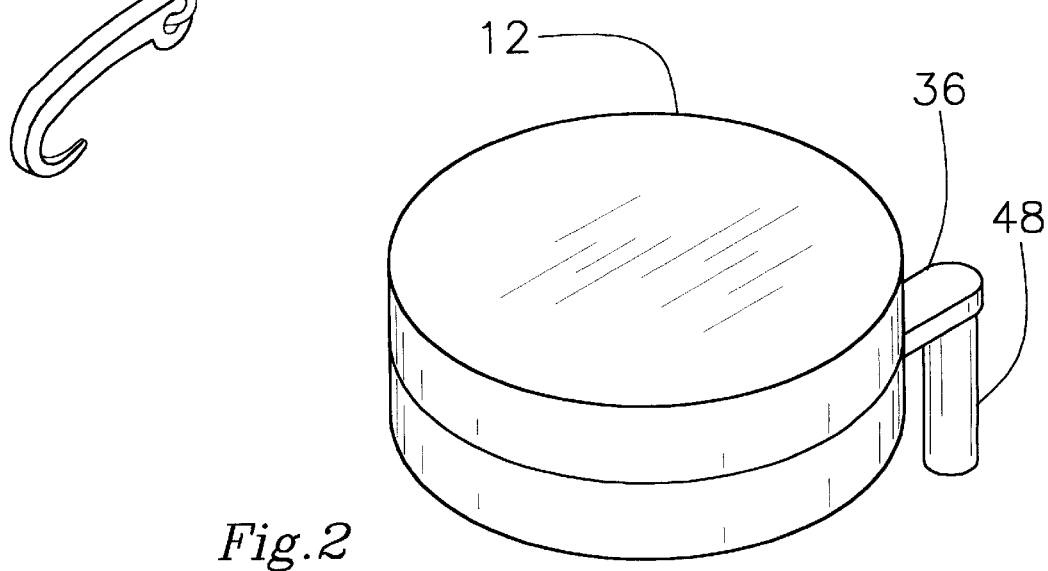
FIG. 2 is a schematic perspective view of the present invention.
Figure 3:
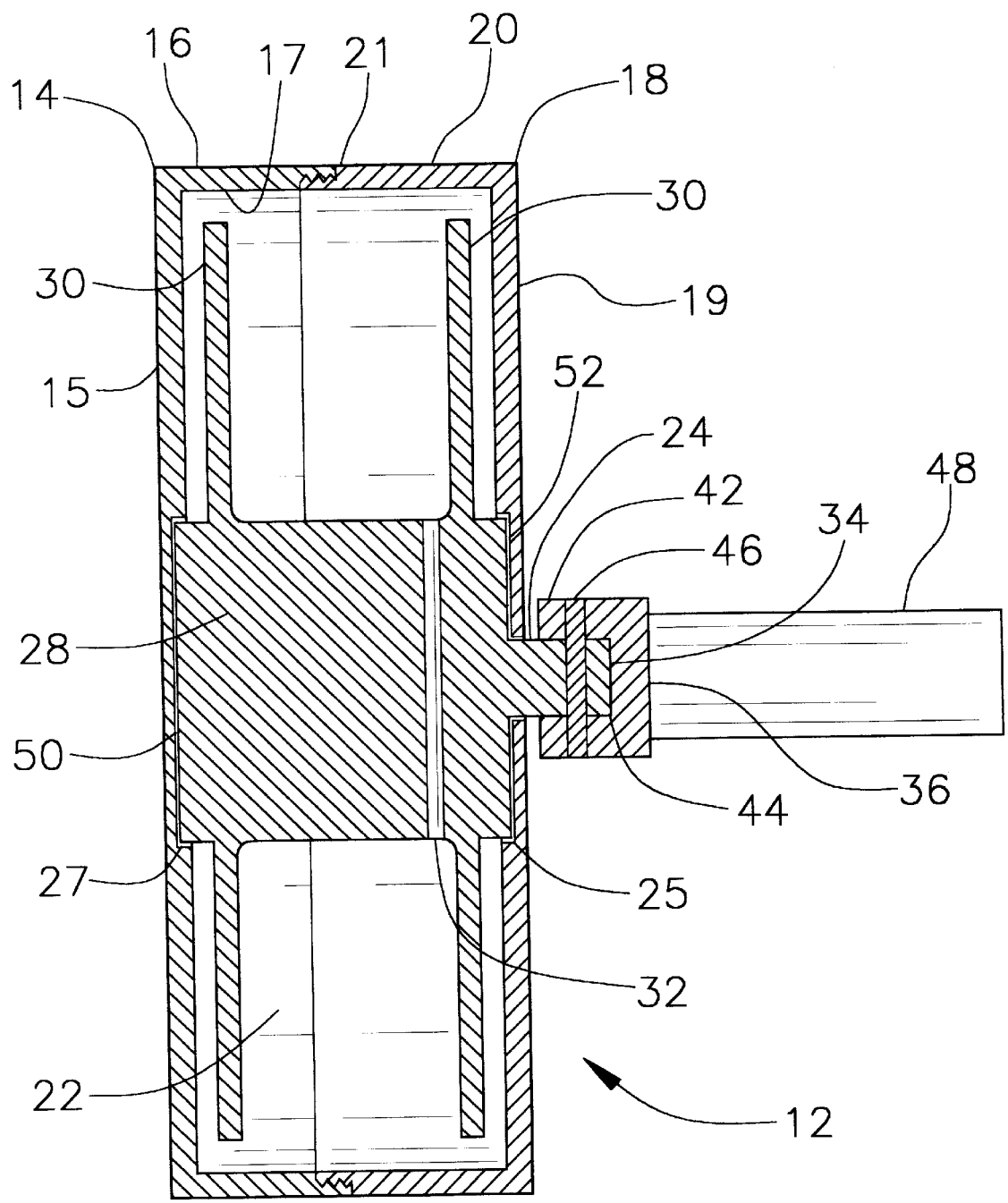
FIG. 3 is a schematic cross-sectional view taken along line 3—3 of the present invention.
Figure 4:
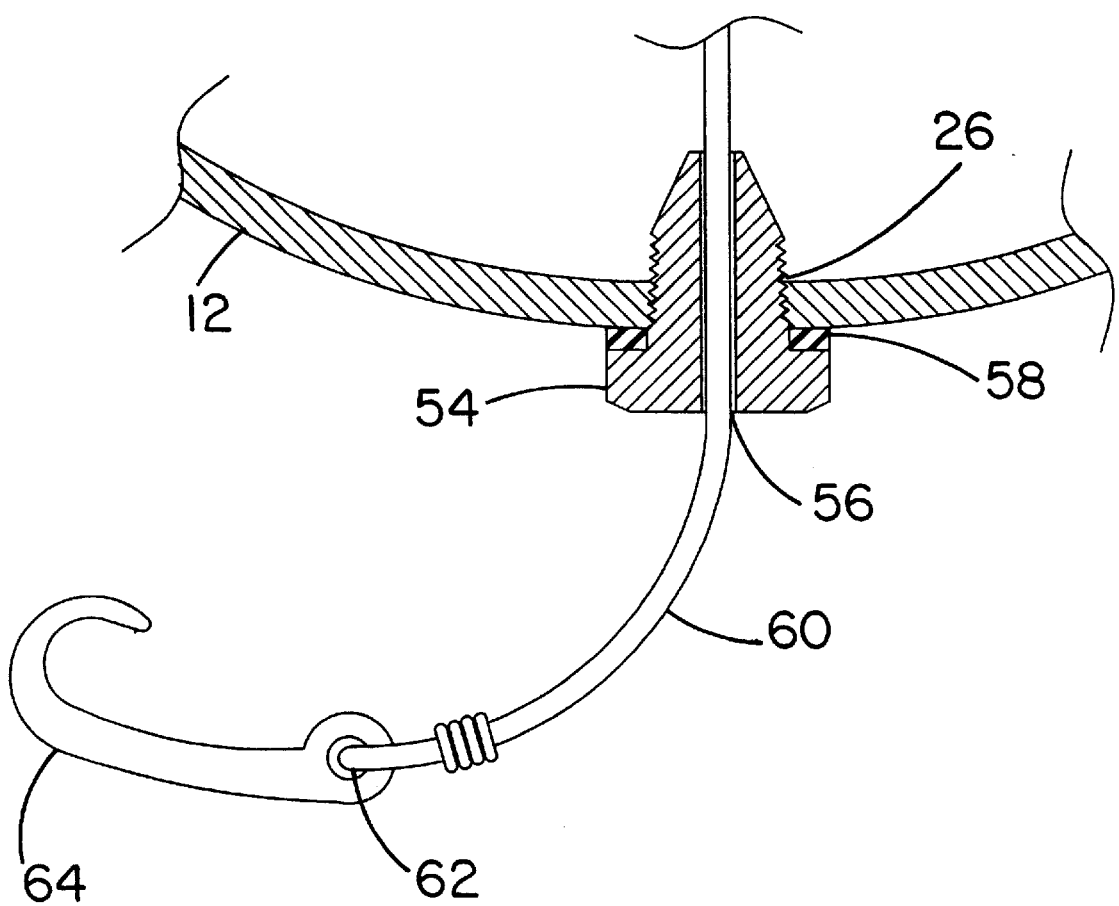
FIG. 4 is a schematic cross-sectional view of the guide member of the present invention.

With reference now to the drawings, and in particular to FIGS. 1 through 4 thereof, a new scent dispensing device embodying the principles and concepts of the present invention and generally designated by the reference numeral 10 will be described.

As best illustrated in FIGS. 1 through 4, the scent dispensing device 10 generally comprises a housing 12. The housing 12 includes a top portion 14. The top portion 14 has a top wall 15. A peripheral wall 16 is coupled to and extends away from the top wall 15. The top wall 15 has a generally circular shape. The peripheral wall 16 has a threaded inner surface 17. A bottom portion 18 of the housing has a bottom wall 19. A peripheral wall 20 is coupled to and extends away from the bottom wall 19. The bottom wall 19 has a generally circular shape. The peripheral wall 20 of the bottom portion has a threaded outer surface 21. The peripheral walls 16, 20 are removably securable to each other by screwing them together such that a lumen 22 is defined between the top 15 and bottom 19 walls. The bottom wall 19 has an opening 24 therein generally positioned in a medial portion of the bottom wall. An inside surface of the bottom wall 19 has an annular depression 25 therein radially extending outwardly from the opening 24. An inside surface of the top wall 15 has an annular depression 27 therein which is generally opposed to the annular depression 25 in the bottom wall 19. A juncture of the peripheral walls has an aperture 26 therein.

A rod 28 is positioned in said lumen 22 and extends between said depressions 25, 27 such that said rod is saddled in said depressions. The rod is rotatable with respect to the housing 12. The rod 28 extends through an axis of and is integrally coupled to a pair of discs 30. Each of the discs 30 is positioned generally adjacent to an opposite end of the rod 28. The discs 30 steady the rod 28 while it is being turned in the housing and also holds the flexible elongate member 60, mentioned below, away from the top 15 and bottom 19 walls. The rod 28 has a bore 32 extending therethrough. The bore 32 is generally located between the discs 30. An end of the rod has a nub 34 thereon. The nub 34 extends outwardly through the opening 24.

A crank means is used for rotating the rod 28 with respect to the housing 12. The crank includes a bar 36 having a first end 38 and a second end 40. A protruding member 42 is integrally coupled to the bar 36 and positioned generally adjacent to the first end 38 of the bar 36. The protruding member 42 has a well 44 therein. The well 44 is adapted to receive the nub 34. The protruding member 42 is securely attached to the nub 34 by a pin 46. A handle member 48 is rotatably coupled to the bar 36. The handle member 48 is positioned generally adjacent to the second end 40 of the bar 36 and extends in an opposite direction with respect to the protruding member 42.

A guide member 54 is positionable in the aperture 26. The guide member 54 has a hole 56 therein. The hole 56 extends from an outer portion of the guide member 54 and into the lumen 22. A gasket 58 may be positioned between the guide member 54 and the housing 12.

A flexible elongate member 60 has a first end, not shown, and second end 62. The first end is extended through the bore 32 in the rod 28 such that the flexible elongate member 60 may be wound about the rod 28. The second end 62 of the flexible elongate member extends through the hole 56 in the guide member 54. A hook member 64 is securely attached to the second end 62 of the flexible elongate member 60. The flexible elongate member 60 preferably comprises a cord.

In use, the top 14 and bottom 18 portions of the housing 12 are opened up so that scented fluid may be placed inside. The second end 62 of the cord 60 is attached to a stationary object. The user then walks toward an area where they want an animal to stand. The fluid coats the flexible elongate member 60 and leads the animal to the hunting stand of the hunter. The crank means is used to draw the flexible elongate member into the housing 12 when the user is finished using the device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A scent dispensing device for holding and dispersing a scented fluid, said device comprising:

a housing having a central axis and including:

a top portion having a top wall, a peripheral wall being coupled to and extending away from said top wall, said top wall having a generally circular shape, said peripheral wall having a substantially cylindrical inner surface rotated about said central axis, said inner surface being threaded;

a bottom portion having a bottom wall, a peripheral wall being coupled to and extending away from said bottom wall, said bottom wall having a generally circular shape, said peripheral wall of said bottom portion having a substantially cylindrical outer surface rotated about said central axis, said outer surface being threaded such that mounting and dismounting of said bottom portion on said top portion requires rotation of said portions relative to each other about said central axis, said opening being positioned in a medial portion of said bottom wall;

wherein said top and bottom portions are threadedly and removably secured to each other such that a lumen is defined between said top and bottom portions, said bottom portion having an opening therein, said housing having an aperture therein, a portion of said aperture being formed in the peripheral wall of said top portion and a portion of said aperture being formed in the peripheral wall of said bottom portion such that said portions of said aperture align to form a substantially circular aperture when said top and bottom portions are mounted together;

a rod being positioned in said housing and extending in a substantially parallel orientation to said central axis, said rod being rotatable about an axis substantially parallel to said central axis, said rod having an end having a nub thereon, said nub extending through said opening in said top portion;

a crank means for rotating said rod with respect to said housing, said crank means being coupled to said nub;

a flexible elongate member, said flexible elongate member having a first end and second end, said first end being coupled to said rod, said second end of said flexible elongate member extending through said aperture;

wherein said rod extends through an axis of and is integrally coupled to a pair of discs, each of said discs being positioned generally adjacent to an opposite end of said rod;

wherein said rod has a bore extending therethrough, said bore being generally located between said discs, wherein said first end of said flexible elongate member is extended through said bore;

wherein said crank bar further comprises:

a bar having a first end and a second end;

a protruding member being integrally coupled to said bar and positioned generally adjacent to said first end of said bar, said protruding member having a well therein, said well being adapted to receive said nub, wherein said protruding member is securely attached to said nub; and a handle member being rotatably coupled to said bar, said handle member being positioned generally adjacent to said second end of said bar and extending in an opposite direction of said protruding member; and a guide member being removably positionable in said aperture such that positioning of said guide member in said aperture block rotation of said top and bottom portions of said housing with respect to each other and removal of said guide member from said aperture permits rotation of said top and bottom portions of said housing with respect to each other, said guide member having a hole therein, said hole extending from an outer portion of said guide member and into said lumen, wherein said second end of said flexible elongate member is extended through said hole in said guide member.

* * * * *